(12) United States Patent
Mallary et al.

(10) Patent No.: US 8,339,735 B2
(45) Date of Patent: Dec. 25, 2012

(54) MAGNETIC WRITER FOR PATTERNED STACK WITH INCREASED WRITE FIELD

(75) Inventors: Michael L. Mallary, Harmony, PA (US);
Ching He, Allison Park, PA (US);
Kaizhong Gao, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 792 days.

(21) Appl. No.: 11/823,917

(22) Filed: Jun. 29, 2007

(65) Prior Publication Data

US 2009/0002896 A1 Jan. 1, 2009

(51) Int. Cl.
*G11B 5/187* (2006.01)
*G11B 5/127* (2006.01)

(52) U.S. Cl. .......... 360/122; 360/125.02; 360/125.3

(58) Field of Classification Search .......... 360/122, 360/125.03, 125.06, 125.09, 125.1, 125.13, 360/125.14, 319, 125.3
See application file for complete search history.

(56) References Cited

U.S. PATENT DOCUMENTS

| | | | | |
|---|---|---|---|---|
| 5,134,535 | A * | 7/1992 | Mallary | 360/125.52 |
| 6,504,675 | B1 | 1/2003 | Murdock et al. | |
| 6,636,390 | B2 * | 10/2003 | Funayama et al. | 360/317 |
| 6,795,277 | B2 * | 9/2004 | Tsuchiya et al. | 360/317 |
| 6,977,108 | B2 * | 12/2005 | Hieda et al. | 428/64.2 |
| 7,050,251 | B2 * | 5/2006 | Lundstrom | 360/51 |
| 7,075,756 | B1 | 7/2006 | Mallary et al. | |
| 7,193,807 | B1 * | 3/2007 | Liikanen et al. | 360/76 |
| 2001/0017751 | A1 * | 8/2001 | Miyazaki et al. | 360/317 |
| 2003/0133213 | A1 * | 7/2003 | Rubin et al. | 360/48 |
| 2004/0080856 | A1 * | 4/2004 | Tomiyama et al. | 360/75 |
| 2005/0013058 | A1 * | 1/2005 | Tsuchiya et al. | 360/317 |
| 2005/0057852 | A1 * | 3/2005 | Yazawa et al. | 360/125 |
| 2005/0118329 | A1 * | 6/2005 | Kamijima | 427/127 |
| 2005/0157597 | A1 * | 7/2005 | Sendur et al. | 369/13.55 |
| 2005/0280936 | A1 * | 12/2005 | Sasaki et al. | 360/126 |
| 2006/0066984 | A1 * | 3/2006 | Tagami | 360/75 |
| 2006/0262453 | A1 * | 11/2006 | Mochizuki et al. | 360/125 |
| 2007/0035878 | A1 * | 2/2007 | Guthrie et al. | 360/125 |
| 2007/0035885 | A1 * | 2/2007 | Im et al. | 360/317 |
| 2007/0206323 | A1 * | 9/2007 | Im et al. | 360/126 |
| 2007/0258161 | A1 * | 11/2007 | Richter et al. | 360/48 |
| 2008/0084635 | A1 * | 4/2008 | Lee et al. | 360/135 |

(Continued)

FOREIGN PATENT DOCUMENTS

JP 2001-236605 8/2001

(Continued)

OTHER PUBLICATIONS

English-machine translation of JP 2005-158192 A to Uejima, published on Jun. 16, 2005.*

*Primary Examiner* — Will J Klimowicz
(74) *Attorney, Agent, or Firm* — Ladas & Parry, LLP

(57) ABSTRACT

A magnetic writer writes to a magnetic medium including a plurality of tracks that each includes a plurality of isolated magnetic elements for storage of information. The magnetic writer includes a write element having a write element tip having a leading edge, a trailing edge, and first and second side edges extending between the leading edge and the trailing edge. A side shield is proximate the first side edge and no shield is proximate the second side edge.

21 Claims, 6 Drawing Sheets

U.S. PATENT DOCUMENTS

| | | | |
|---|---|---|---|
| 2008/0204915 A1* | 8/2008 | Albrecht et al. | 360/48 |
| 2008/0273276 A1* | 11/2008 | Guan | 360/319 |
| 2008/0273277 A1* | 11/2008 | Guan et al. | 360/319 |
| 2010/0020435 A1* | 1/2010 | Chen et al. | 360/77.02 |

FOREIGN PATENT DOCUMENTS

| | | | |
|---|---|---|---|
| JP | 2003016609 A | | 1/2003 |
| JP | 2003151103 A * | | 5/2003 |
| JP | 2005158192 A * | | 6/2005 |
| JP | 2006012294 A * | | 1/2006 |
| JP | 2006048921 A * | | 2/2006 |
| JP | 2006073058 A | | 3/2006 |
| JP | 2006099852 A * | | 4/2006 |
| JP | 2006134540 A | | 5/2006 |
| JP | 2006221786 A * | | 8/2006 |
| JP | 2006323899 A * | | 11/2006 |
| JP | 2007-035165 | | 2/2007 |
| JP | 2007073116 A * | | 3/2007 |

\* cited by examiner

MAGNETIC WRITER FOR PATTERNED STACK WITH INCREASED WRITE FIELD

FIELD

The present invention relates to magnetic recording systems. More particularly, the present invention relates to a magnetic writer for writing to patterned media having an increased write field.

BACKGROUND

As areal densities increase, smaller bit cells are required in the magnetic medium (track width and bit length). However, superparamagnetic instabilities become an issue as the grain volume (i.e., the number of grains in the media per bit cell) of the recording medium is reduced in order to control media noise for high areal density recording. The superparamagnetic effect is most evident when the grain volume V is sufficiently small that the inequality $K_u V/k_B T > 70$ can no longer be maintained. $K_u$ is the material's magnetic crystalline anisotropy energy density, $k_B$ is Boltzmann's constant, and T is absolute temperature. When this inequality is not satisfied, thermal energy demagnetizes the stored bits. Therefore, as the grain size is decreased in order to increase the areal density, a threshold is reached for a given material $K_u$ and temperature T such that stable data storage is no longer feasible.

Bit-patterned magnetic media (BPM) have been proposed as a means for preventing magnetization reversal due to the superparamagnetic effect. A patterned medium may include a plurality of discrete, independent regions of magnetic material that form discrete, independent magnetic elements, which function as recording bits in the medium. The magnetic bits or elements are arranged in a regular pattern over the medium substrate. Each bit or element has a small size and magnetic anisotropy such that, in the absence of an applied magnetic field, the magnetic moment of each magnetic bit or element is aligned along the same magnetic easy axis.

In order to write at very high areal densities, the size of the write pole may be decreased to increase the track density. However, the strength of the write field achievable by the writer decreases with a reduction in the write pole width. The write field is reduced even further by conventional side shielding assemblies. In addition, as the write pole moves radially across the medium, the field profile from the write pole tip becomes skewed relative to the magnetic bits or elements in the magnetic medium. This can lead to writing errors and inadvertent erasure of previously recorded data. While effects on the writing process due to skewing can be somewhat mitigated by increasing the length of the write pole, the head-to-medium spacing (HMS) and medium thickness cannot be scaled down to the same extent as the write pole width to further remedy skewing effects.

SUMMARY

The present invention relates to a magnetic writer for writing to a magnetic medium that includes a plurality of tracks. Each track includes a plurality of isolated magnetic elements for storage of information. The magnetic writer includes a write element having a write element tip having a leading edge, a trailing edge, and side edges extending between the leading edge and the trailing edge. The write element has a write element length extending from the leading edge to the trailing edge. A first shield is proximate the first side edge and no shield is proximate the second side edge.

In another aspect, a magnetic recording system includes a write element including a write element tip having a leading edge and a trailing edge. A width of the trailing edge is greater than a width of an isolated magnetic element on the magnetic medium, and at least one surface of the write element that extends in a cross-track direction has no line of symmetry.

In a further aspect, a magnetic medium includes a plurality of tracks that each includes a plurality of isolated magnetic elements for storage of information. A write element includes a write element tip that has a medium confronting surface defined by a leading edge, a trailing edge, and first and second side edges connecting the leading edge to the trailing edge. The width of the trailing edge is greater than the width of an isolated magnetic element on the magnetic medium, and at least one surface of the write element that extends in a cross-track direction has no line of symmetry. A first shield is proximate the first side edge and no shield is proximate the second side edge.

The above summary of the present invention is not intended to describe each disclosed embodiment or every implementation of the present invention. The figures and the detailed description which follow more particularly exemplify illustrative embodiments.

While some of the above-identified figures set forth one or more embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. It should also be understood that the above-identified figures are not drawn to scale.

DETAILED DESCRIPTION

Figure 1:
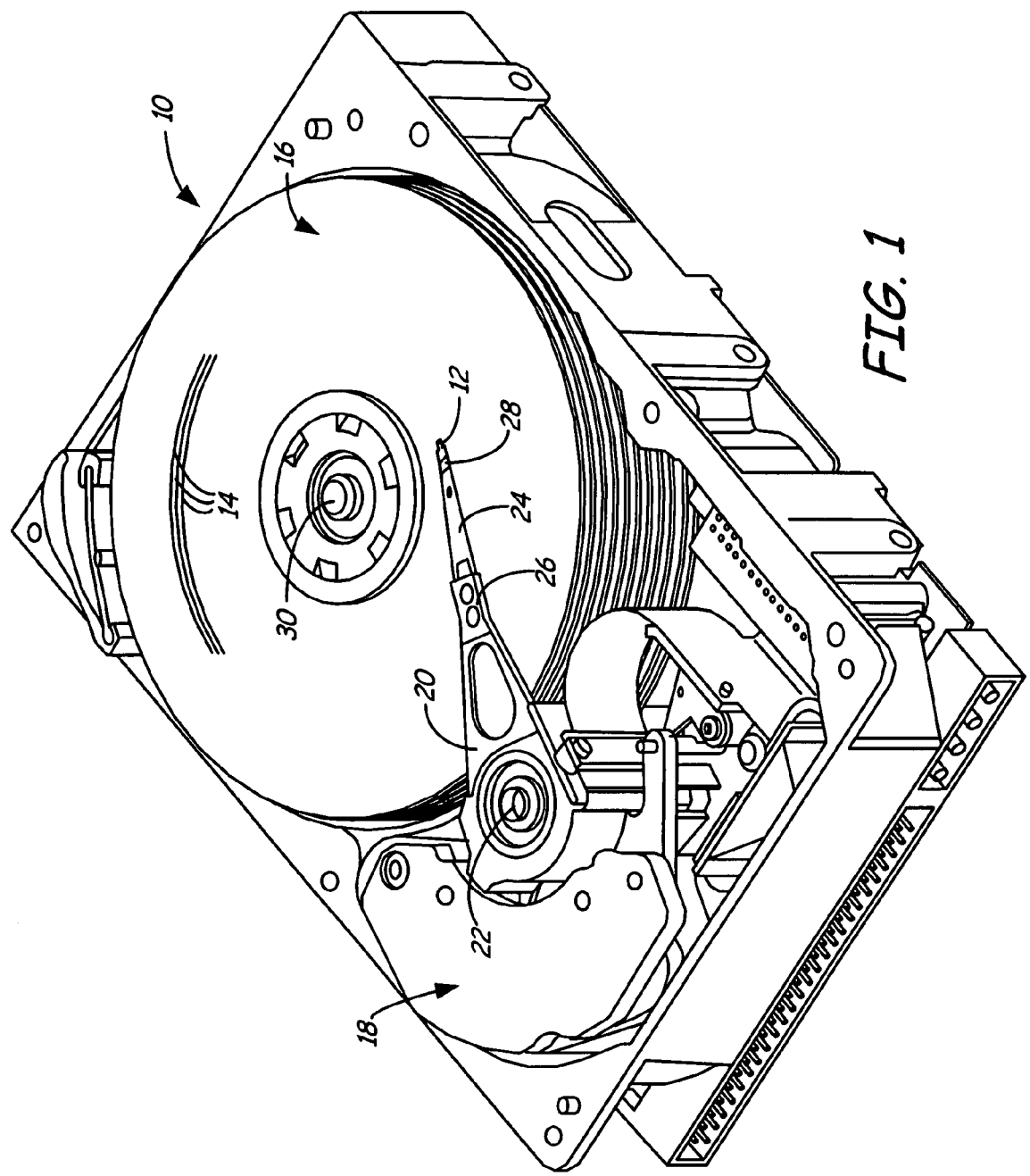
FIG. 1 is a perspective view of a magnetic recording system.

FIG. 1 is a perspective view of a disc drive 10 including an actuation system for positioning slider 12 over track 14 of magnetic medium 16. The particular configuration of disc drive 10 is shown for ease of describing the present invention and is not intended to limit the scope of the present invention in any way. Disc drive 10 includes a voice coil motor (VCM) 18 arranged to rotate an actuator arm 20 on a spindle around an axis 22. A load beam 24 is connected to actuator arm 20 at a head mounting block 26. A suspension 28 is connected to an end of load beam 24 and slider 12 is attached to suspension 28. VCM 18 is regulated by a controller that is not shown in this view and is well known in the art. Magnetic medium 16 rotates around an axis 30, so that windage is encountered by slider 12 to keep it aloft a small distance above the surface of magnetic medium 16. Each track 14 of magnetic medium 16 is formatted with an array of data storage cells for storing data. Slider 12 carries a magnetic transducer (not shown in FIG. 1) for reading and/or writing data on tracks 14 of magnetic medium 16. The magnetic transducer is described in more detail by way of examples in the following figures.

Figure 2:
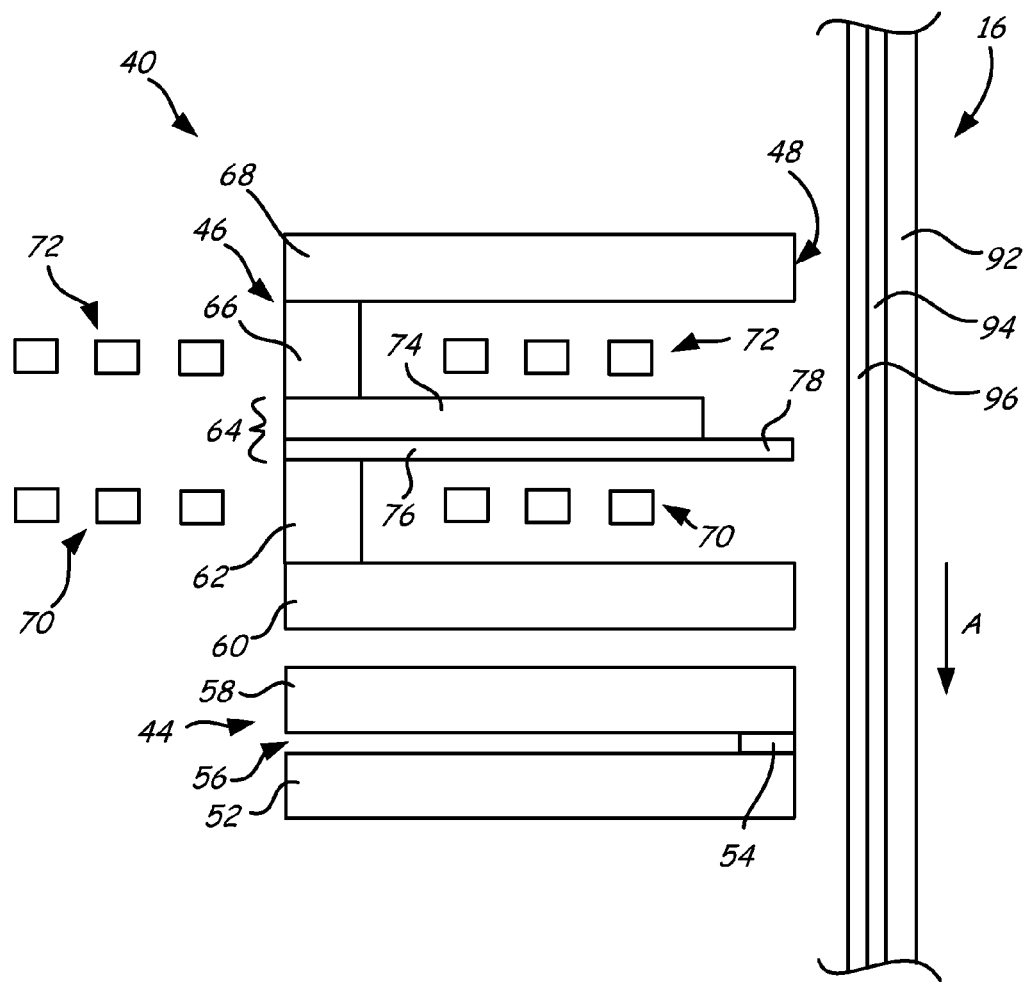
FIG. 2 is a cross-sectional view of a transducing head including a write element for writing to patterned media.

FIG. 2 is a cross-sectional view of transducing head 40 formed on slider 12 and including reader 44 and writer 46 that define medium confronting surface 48. Reader 44 includes bottom shield structure 52, read element 54, read gap 56, and top shield structure 58. Writer 46 includes first return pole or element 60, first magnetic stud 62, write pole or element 64, second magnetic stud 66, second return pole or element 68, first conductive coil 70, and second conductive coil 72. Write pole or element 64 includes write pole or element body 76, yoke 74, and write pole or element tip 78.

Reader 44 and writer 46 are each multi-layered devices, and writer 46 is stacked on reader 44 in a piggyback configuration in which layers are not shared between the two elements. In other embodiments not illustrated, reader 44 and writer 46 may be arranged in a merged-head configuration (in which layers are shared between the two elements) and/or reader 44 may be formed on writer 46.

Read gap 56 is defined on medium confronting surface 48 between terminating ends of bottom shield 52 and top shield 58. Read element 54 is positioned in read gap 56 adjacent medium confronting surface 48. Read gap 56 insulates read element 54 from bottom shield 52 and top shield 58. Read element 54 may be any variety of different types of read elements, such as a tunneling magnetoresistive (TMR) read element or a giant magnetoresistive (GMR) read element. In operation, magnetic flux from a surface of magnetic medium 16 causes rotation of a magnetization vector of read element 54, which in turn causes a change in electrical resistivity of read element 54. The change in resistivity of read element 54 can be detected by passing a current through read element 54 and measuring a voltage across read element 54. Shields 52 and 58, which may be made of a soft ferromagnetic material, guide stray magnetic flux from medium layer 96 away from read element 54 outside the area of medium layer 96 directly below read element 54.

In writer 46, first return pole 60, second return pole 68, first magnetic stud 62, and second magnetic stud 66 may comprise soft magnetic materials, such as NiFe. Conductive coils 70 and 72 may comprise a material with low electrical resistance, such as Cu. Write pole body 76 may comprise a high moment soft magnetic material, such as CoFe. Yoke 74 may comprise a soft magnetic material, such as NiFe or CoNiFe, to improve the efficiency of flux delivery to write pole body 64. First conductive coil 70 surrounds first magnetic stud 62, which magnetically couples write pole 64 to first return pole 60. Second conductive coil 72 surrounds second magnetic stud 66, which magnetically couples write pole 64 to second return pole 68. First conductive coil 70 passes through the gap between first return pole 60 and write pole 64, and second conductive coil 72 passes through the gap between write pole 64 and second return pole 68.

Reader 44 and writer 46 are carried over the surface of magnetic medium 16, which is moved relative to transducing head 40 as indicated by arrow A such that write pole 76 leads first return pole 60, trails second return pole 68, and is used to physically write data to magnetic medium 16. In order to write data to magnetic medium 16, current is caused to flow through second conductive coil 72. The magnetomotive force in the coils causes magnetic flux to travel from write pole tip 78 perpendicularly through medium layer 96, across SUL 94, and through second return pole 68 and first magnetic stud 66 to provide a closed magnetic flux path. The direction of the write field at the medium confronting surface of write pole tip 78, which is related to the state of the data written to magnetic medium 16, is controllable based on the direction that the current flows through second conductive coil 60.

Stray magnetic fields from outside sources, such as a voice coil motor associated with actuation of transducing head 40 relative to magnetic medium 16, may enter SUL 94. Due to the closed magnetic path between write pole 64 and second return pole 68, these stray fields may be drawn into writer 46 by second return pole 68. In order to reduce or eliminate these stray fields, first return pole 60 is connected to write pole 64 via first magnetic stud 62 to provide a flux path for the stray magnetic fields. In addition, the strength of the write field through write pole 64 (due to current flowing through second conductive coil 72) may be augmented by causing current to flow through first conductive coil 70. The magnetomotive force in the coils causes magnetic flux to travel from write pole tip 78 perpendicularly through medium layer 96, across SUL 94, and through first return pole 60 and first magnetic stud 62 to provide a closed magnetic flux path. The direction of the current through first conductive coil 70 is opposite that of the current through conductive coil 72 to generate magnetic flux in the same direction through write pole 64. The effect of employing two return poles and two conductive coils is an efficient driving force to write pole 64, with a reduction on the net driving force on first return pole 60 and second return pole 68.

Writer 46 is shown merely for purposes of illustrating a construction suitable for use with the assemblies described in the following figures, and variations on the design may be made. For example, while write pole 64 includes write pole body 76 and yoke 74, write pole 64 can also be comprised of a single layer of magnetic material. In addition, a single trailing return pole may be provided instead of the shown dual return pole writer configuration. Also, a shield may additionally be formed to extend from first return pole 60 toward write pole 64 proximate medium confronting surface 48 in a "trailing shield" magnetic writer design. Furthermore, writer 46 is configured for writing data perpendicularly to magnetic medium 16, but writer 46 and magnetic medium 16 may also be configured to write data longitudinally.

Transducing head 40 confronts magnetic medium 16 at medium confronting surface 48. Magnetic medium 16 includes substrate 92, soft underlayer (SUL) 94, and medium layer 96. SUL 94 is disposed between substrate 92 and medium layer 96. Magnetic medium 16 is positioned proximate to transducing head 40 such that the surface of medium layer 96 opposite SUL 94 faces reader 44 and writer 46. In some embodiments, magnetic medium 16 is a bit patterned medium.

Figure 3:
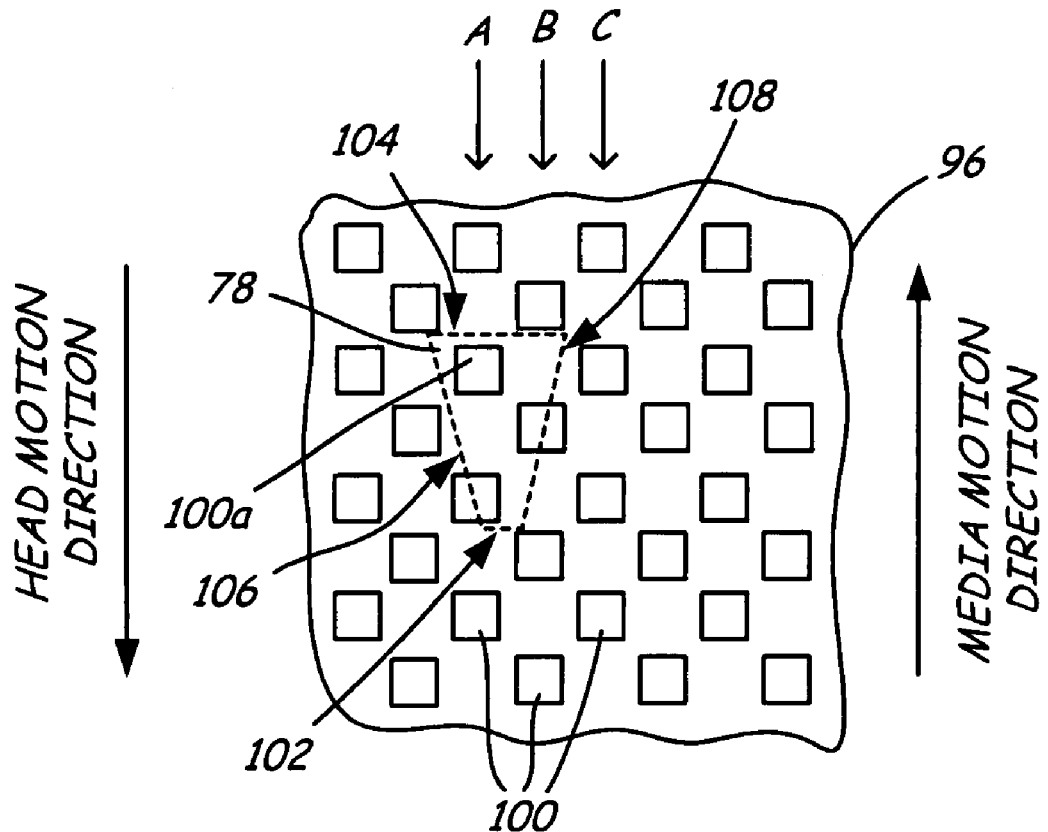
FIG. 3 is a plan view of the medium confronting surface of the write element tip positioned over a patterned magnetic medium.

FIG. 3 is a plan view of the medium confronting surface of write pole tip 78 positioned over medium layer 96. In the embodiment shown, write pole tip 78 has a substantially trapezoidal shape and medium layer 96 is a bit patterned medium. The relative directions of movement between write pole tip 78 and medium layer 96 are shown. Medium layer 96 includes a plurality of spaced apart magnetic elements or bits 100, and each vertical column of bits 100 on medium layer 96 make up a track of magnetic medium 16. Three tracks of medium layer 96 are labeled A, B, and C in FIG. 3. Each bit 100 is composed of a magnetic material with quiescent state magnetization oriented along its easy axis. Bits 100 are arranged in a staggered array on medium layer 96 to prevent interference between the magnetizations of adjacent bits. While bits 100 are illustrated as square shaped elements, it will be appreciated that bits 100 may have any shape and may be arranged in any pattern on magnetic layer 96. In addition, while bits 100 are arranged in a staggered array on medium layer 96, it will be appreciated that bits 100 may be arranged in other configurations on medium layer 96, such as parallel, non-staggered tracks.

Write pole tip 78 includes leading edge 102, trailing edge 104, and sides 106 and 108 that together define the medium confronting surface of write pole tip 78. Trailing edge 104 has a width greater than the width of each bit 100. In some embodiments, trailing edge 104 has a width of at least about 1.2 times the width of each bit 100. A larger write pole tip 78 provides a larger write field than devices that include write pole tips scaled to the size of the bits being written. With a larger write field, data is more easily written to magnetic medium 16 as the high coercivity of bits 100 in medium layer 96 is more readily overcome. In addition, write pole tip 78 may have a substantially trapezoidal shape as is shown to reduce the effects of skew angle as transducing head 40 travels in an arc across magnetic medium 16 on slider 12.

As write pole tip 78 moves in the down-track direction, each bit 100 may be partially or completely under the medium confronting surface of write pole tip 78 (i.e., under the "footprint" of write pole tip 78). For example, during a write operation write pole tip 78 may be positioned over tracks A and B. When bit 100a of track A is completely under the footprint of write pole tip 78, data is fully written to bit 100a by write pole 34. On the other hand, when bit 100b of track B and bit 100c of track A are partially under the footprint of write pole tip 78, data is only partially written by write pole 34. When this occurs, bits 100b and 100c are "trimmed" by write pole tip 78. As write pole tip 78 continues to move in the down-track direction, bit 100b is completely covered by the footprint of write pole tip 78 and consequently data is fully written to bit 100b by write pole 34. When write pole tip 78 moves further in the down-track direction, bit 100c is subsequently fully written when bit 100c is completely under the footprint of write pole tip 78. In this way, bits 100a, 100b, and 100c in adjacent tracks A and B are written in a staggered fashion. Write pole tip 78 may be subsequently moved such that bits 100 of tracks B and C are alternately completely under the footprint of write pole tip 78. Thus, because write pole tip 78 writes to a track multiple times to assure the appropriate data is written to each bit, write pole tip 78 may be very large to generate a correspondingly large write field.

Figure 4:
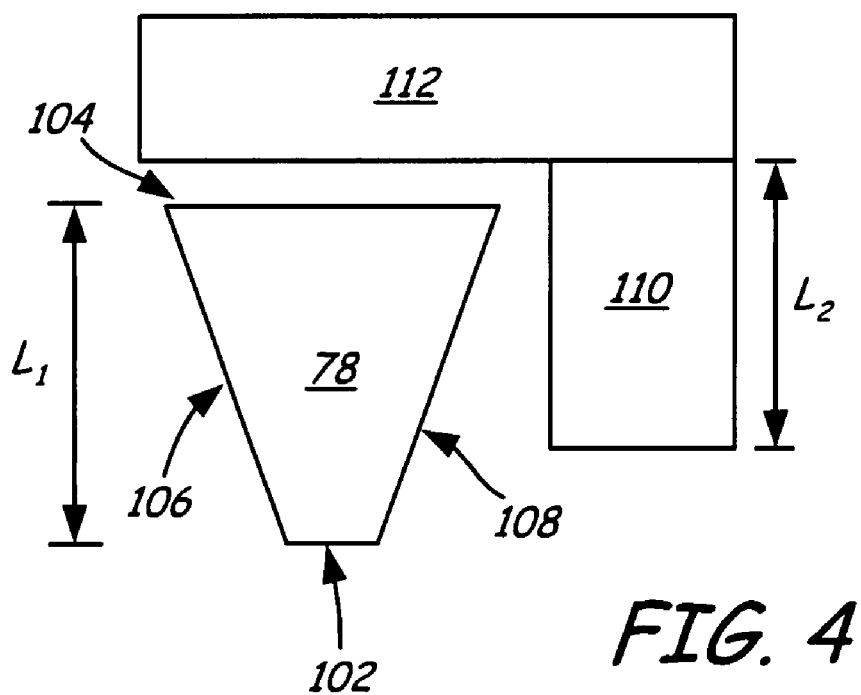
FIG. 4 is a medium confronting surface view of the write pole tip including shields disposed proximate one side edge and the trailing edge.

FIG. 4 is a medium confronting surface view of write pole tip 78 including leading edge 102, trailing edge 104, and side edges 106 and 108 that define the medium confronting surface. First shield 110 is disposed adjacent side edge 108 and second shield 112 is disposed adjacent trailing edge 112. A shield may alternatively be disposed adjacent side edge 106 instead of side edge 108. In some embodiments, first shield 110 and second shield 112 are formed integrally with each other.

Write pole tip 78 has length $L_1$ at the medium confronting surface and side shield 110 has length $L_2$ at the medium confronting surface. In some embodiments, length $L_2$ is less than length $L_1$, while in other embodiments first shield 110 extends to leading edge 102. The use of side shield 110 on a single side of write pole tip 78 (as opposed to both sides 106 and 108) improves the write field generated by write pole tip 78. This is because shields can draw some of the write flux away from write pole tip 78. In the embodiment shown with a single side shield 110 with length $L_2$ of side shield 110 less than length $L_1$ of write pole tip 78, the effect of shields 110 and 112 on the write field is minimized, thereby increasing the write field at magnetic medium 16.

In addition, first shield 110 and second shield 112 reduce fringe fields that may be generated by write pole tip 78 during the write process and provide a sharper write field transition in the region of write pole tip 78 adjacent shields 110 and 112. This is especially important to the write process described with regard to FIG. 3 in that the sharp transition more reliably erases and trims tracks on magnetic medium 16 prior to being fully written by write pole tip 78.

As described above, write element tip 78 is employed to write data to bits 100 on one track while bits 100 on adjacent tracks under the footprint of write element tip 78 are erased and trimmed by write element tip 78. Consequently, the shape of write element body 76 and write element tip 78 may be manipulated to optimize the field profile in the region of the track being written while minimizing fringing fields in adjacent tracks with trimmed bits 100.

Figure 5A:
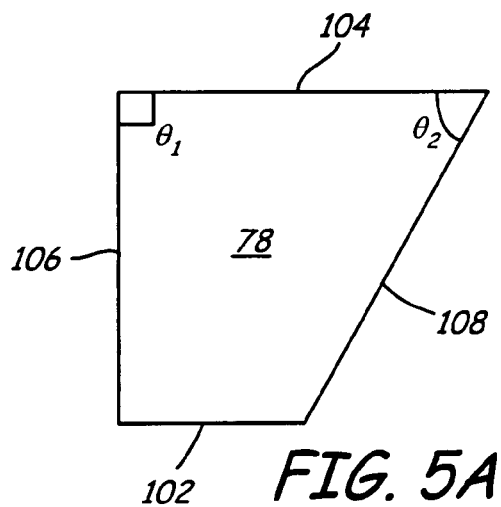
FIGS. 5A and 5B are medium confronting surface views of write pole tips having an asymmetric profile to reduce fringing fields.
Figure 5B:
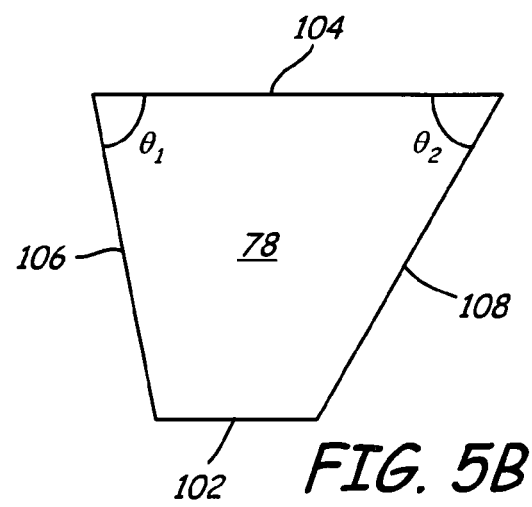

FIGS. 5A and 5B are medium confronting surface views of write pole tip 78 having an asymmetric profile to reduce fringing fields. In both FIGS. 5A and 5B, write pole tip 78 is asymmetric in that it has no line of symmetry, and thus is asymmetric with respect to all dividing lines. In both examples, trailing edge 104 and side edge 106 define a first angle $\theta_1$ that is different than second angle $\theta_2$ defined by trailing edge 104 and side edge 108. In some embodiments, first angle $\theta_1$ and second angle $\theta_2$ differ by at least about 5°. First angle $\theta_1$ may be greater than second angle $\theta_2$ to reduce the effects of skew angle on the track being written and to reduce fringing fields in adjacent trimmed tracks to increasing the overall write field generated by write pole tip 78.

Figure 6:
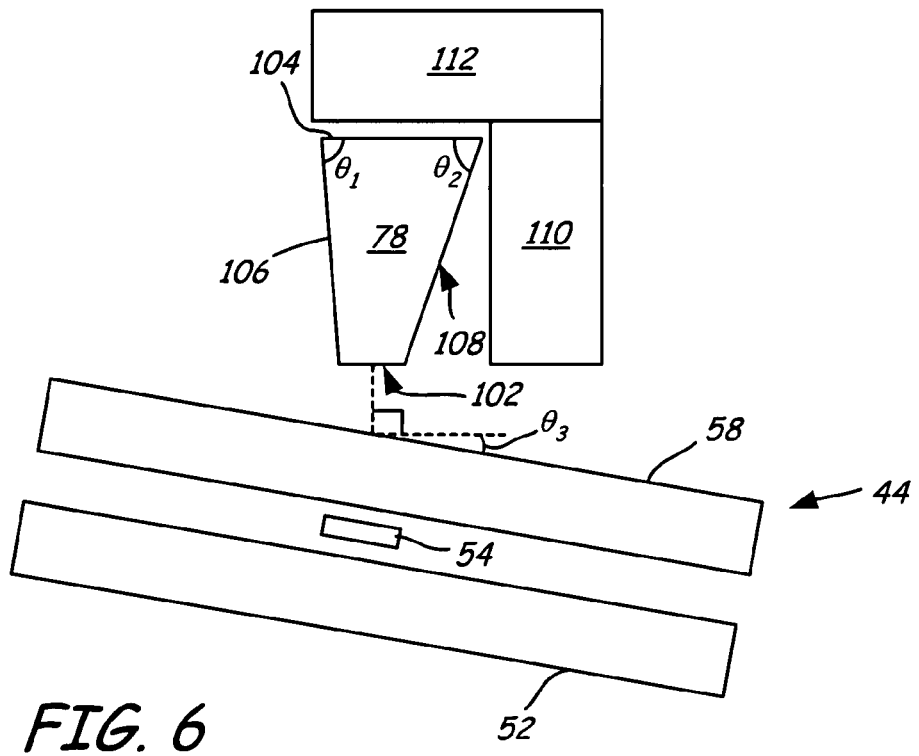
FIG. 6 is a medium confronting surface view of the write pole tip adjacent a reader assembly disposed at a non-zero angle relative to the leading and trailing edges of the write pole tip.

FIG. 6 is a medium confronting surface view of write pole tip 78 adjacent first shield 110, second shield 112, and reader assembly 44. Write pole tip 78 may have an asymmetric profile as described with regard to FIGS. 5A and 5B, wherein first angle $\theta_1$ is different than second angle $\theta_2$. When write pole tip 78 is asymmetric, the curvature of the written transition from write pole tip 78 is also asymmetric with respect to the center of the track, which results in an angular change in the cross-track profile of the data written. To account for this small angular change during read back, part or all of reader assembly 44 may be disposed at a non-zero angle $\theta_3$ with respect to leading edge 102 and trailing edge 104 of write pole tip 78. In the embodiment shown, bottom shield structure 52, read element 54, and top shield structure 58 are all disposed at angle $\theta_3$. In other embodiments, any combination of bottom shield structure 52, read element 54, and top shield structure 58 may be disposed at angle $\theta_3$. Angle $\theta_3$ may be optimized using simulations based on various parameters, such as the positioning and shape of shields 110 and 112 and the shape of write pole tip 78.

Figure 7A:
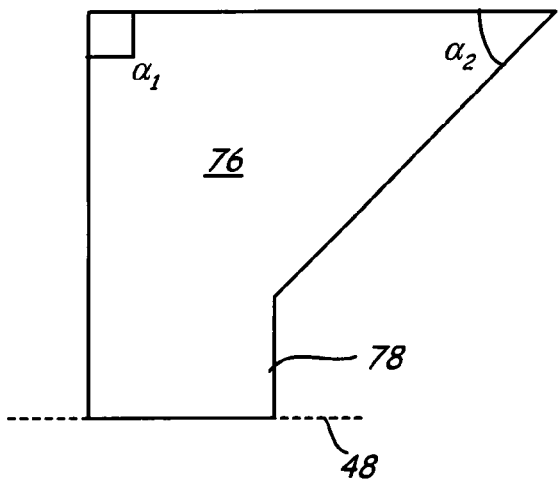
FIGS. 7A-7C are side views of write element bodies having asymmetric profiles to reduce fringing fields.
Figure 7B:
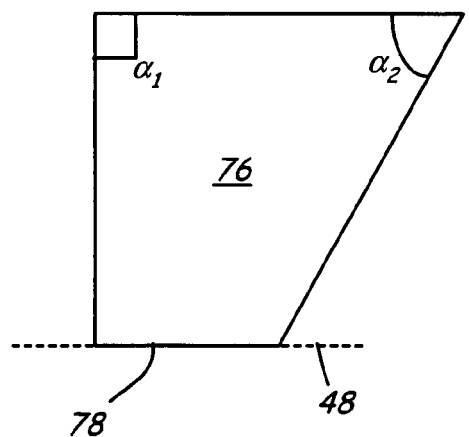
Figure 7C:
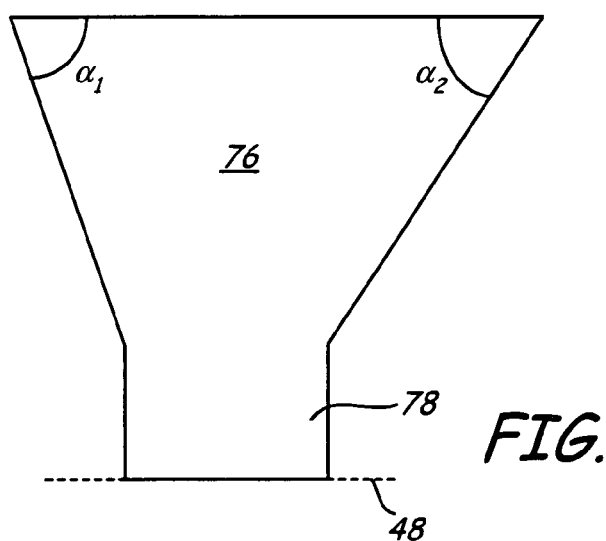

The shape of write pole body 76 may also be manipulated to minimize fringing fields in adjacent tracks with trimmed bits 100 and improve the write field. FIGS. 7A-7C are side views of write pole bodies 76 having asymmetric profiles in that each has no line of symmetry. In each example, edges of write pole body 76 define angles $\alpha_1$ and $\alpha_2$ distal from medium confronting surface 48. In FIG. 7A, angle $\alpha_1$ is a right angle and write pole tip 78 has a throat away from medium confronting surface 48. In FIG. 7B, angle $\alpha_1$ is a right angle and write pole tip 78 has no throat. In FIG. 7C, angle $\alpha_1$ and angle $\alpha_2$ are both acute angles and write pole tip 78 has a throat away from medium confronting surface 48. In all cases, angle $\alpha_1$ is different than angle $\alpha_2$, and in some embodiments, angle $\alpha_1$ is greater than angle $\alpha_2$. The write field at write pole tip 78 is increased due to the larger profile of write pole body 76 on the side proximate angle $\alpha_2$, while fringing fields are by the reduced material extension on the side proximate angle $\alpha_1$.

Figure 8A:
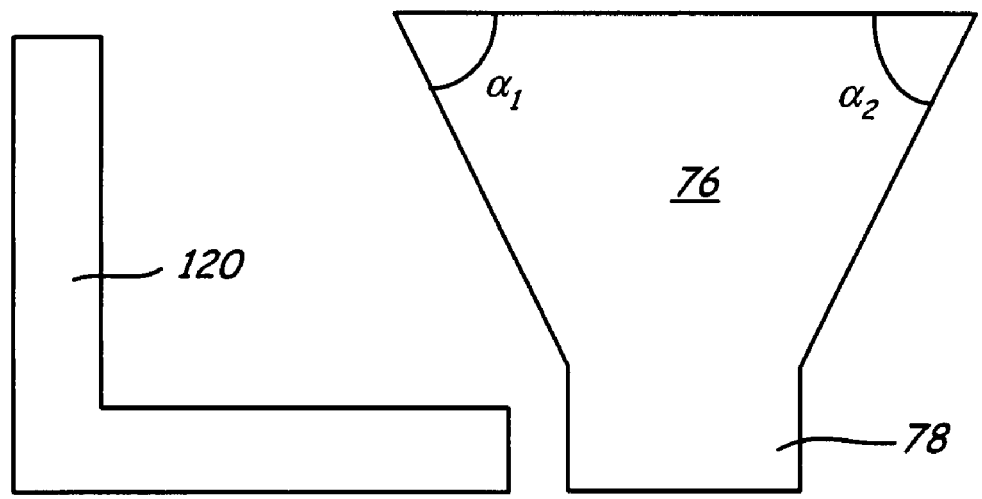
FIGS. 8A and 8B are side views of write element bodies adjacent asymmetric shields for reducing fringing fields.
Figure 8B:
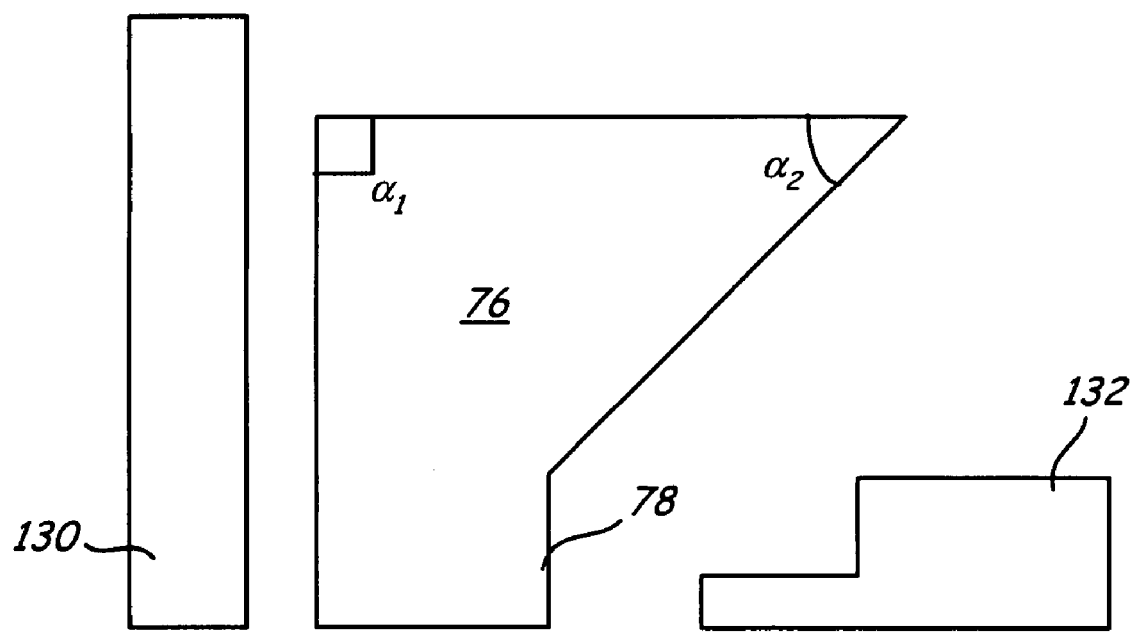

To further reduce fringing fields and focus the write field to the pole tip region, shields may also be provided on the cross-track sides of write pole body 76. FIG. 8A is a side view of a symmetric write pole body 76 with an adjacent asymmetric shield 120. FIG. 8B is a side view of an asymmetric write pole body 76 with adjacent asymmetric shields 130 and 132. Shield 120 in FIG. 8A and shields 130 and 132 in FIG. 8B are sized and shaped to minimize the effects of skew angle on the track being written and to reduce fringing fields in adjacent trimmed tracks to increasing the overall write field generated by write pole tip 78.

It should be noted that while the design variations for write pole body 76 and write pole tip 78 have been described individually, any of the aforementioned embodiments may also be combined in a magnetic writer to provide enhanced device performance. In addition, the embodiments illustrated are merely by way of example, and it will be appreciated that variations on the designs and the concepts described are also contemplated.

In summary, the present invention relates to a magnetic writer for writing to a magnetic medium including a plurality of tracks that each includes a plurality of isolated magnetic elements for storage of information. The magnetic writer includes a write element having a write element tip having a leading edge, a trailing edge, and first and second side edges extending between the leading edge and the trailing edge. The write element has a write element length extending from the leading edge to the trailing edge. A side shield is proximate the first side edge and no shield is proximate the second side edge. The use of side shield on a single side of the write element tip increases the write field at the magnetic medium compared to a shield on both side edges. In some embodiments, at least one surface of the write element extending in the cross-track direction has no line of symmetry. The asymmetry of the write element reduces fringing fields and further increases the write field of the device.

Although the present invention has been described with reference to preferred embodiments, workers skilled in the art will recognize that changes may be made in form and detail without departing from the spirit and scope of the invention.

The invention claimed is:

1. A magnetic recording system for writing to a magnetic stack including a plurality of tracks that each includes a plurality of isolated magnetic elements for storage of information, each isolated magnetic element isolated in a track direction, the magnetic recording system comprising:
   a write element including a write element tip having a leading edge, a trailing edge, and first and second side edges connecting the leading edge to the trailing edge; and
   wherein the write element tip and the magnetic stack are configured such that a footprint of the write element tip is operative to completely cover a first isolated magnetic element in a first track and simultaneously at least partially to cover a second isolated magnetic element in a second track that is adjacent to the first track.

2. The magnetic recording system of claim 1, further comprising a first shield proximate the first side edge, wherein the write element has a write element tip length extending from the leading edge to the trailing edge, and wherein the first shield has a down-track length less than or equal to the write element tip length.

3. The magnetic recording system of claim 2, and further comprising:
   a second shield proximate the trailing edge of the write element tip.

4. The magnetic recording system of claim 3, wherein the second shield is integral with the first shield.

5. The magnetic recording system of claim 1, wherein the leading edge, the trailing edge, and the first and second side edges define a stack confronting surface having a substantially trapezoidal profile with a maximum width at the trailing edge.

6. The magnetic recording system of claim 1, wherein at least one surface of the write element that extends in a cross-track direction has no line of symmetry.

7. The magnetic recording system of claim 6, wherein the at least one surface of the write element is selected from the group consisting of a stack confronting surface, a trailing surface, and a leading surface.

8. The magnetic recording system of claim 1, wherein a first angle defined by the first side edge and trailing edge is different than a second angle defined by the second side edge and the trailing edge.

9. A magnetic recording system for writing to and reading from a magnetic stack including a plurality of tracks that each includes a plurality of isolated magnetic elements for storage of information, each isolated magnetic element isolated in a track direction, the magnetic recording system comprising:
   a write element including a write element tip including a leading edge and a trailing edge, and a first and second side edge extending between the leading edge and the trailing edge, wherein
   a surface defined by the leading edge, the trailing edge and the first and second side edges that extends in a cross-track direction has no line of symmetry; and
   said write element tip comprises a throat arranged away from a stack confronting surface of said write element wherein the write element tip and the magnetic stack are configured such that a footprint of the write element tip is operative to completely cover a first isolated magnetic element in a first track and simultaneously at least partially to cover a second isolated magnetic element in a second track that is adjacent to the first track.

10. The magnetic recording system of claim 9, wherein a first angle formed between the first side edge and the trailing edge is different than a second angle formed between the second side edge and the trailing edge.

11. The magnetic recording system of claim 10, wherein the difference between the first angle and the second angle is at least about 5°.

12. The magnetic recording system of claim 9, and further comprising:
   a reader assembly, wherein at least a portion of the reader assembly is disposed at a non-zero angle relative to the trailing edge of the write element.

13. The magnetic recording system of claim 9, further comprises:
   a first shield proximate the first side edge and no shield proximate the second side edge.

14. The magnetic recording system of claim 13, wherein the write element has a write element tip length extending from the leading edge to the trailing edge, and wherein the first shield has a down-track length less than or equal to the write element tip length.

15. The magnetic recording system of claim 13, further comprising:
   a second shield adjacent to a trailing edge of the write element, wherein the first shield is integral with the second shield.

16. A magnetic recording system comprising:
a magnetic stack including a plurality of tracks that each includes a plurality of isolated magnetic elements for storage of information, each isolated magnetic element is isolated in a track direction perpendicular to a cross-track direction;
a write element including a write element tip having a stack confronting surface defined by a leading edge, a trailing edge, and first and second side edges connecting the leading edge to the trailing edge, wherein the write element tip is configured such that a footprint of the write element tip completely covers a first isolated magnetic element in a first track and simultaneously at least partially covers a second isolated magnetic element in a second track that is adjacent to the first track wherein the write element has a write element tip length extending from the leading edge to the trailing edge; and
a shield proximate the first side edge and no shield proximate the second side edge, wherein the shield has a down-track length less than or equal to the write element tip length to increase write field at the magnetic stack.

17. The magnetic recording system of claim 16, wherein the stack confronting surface has a substantially trapezoidal profile with a maximum width at the trailing edge.

18. The magnetic recording system of claim 16, wherein a first angle defined by the first side edge and trailing edge is different than a second angle defined by the second side edge and the trailing edge.

19. The magnetic recording system of claim 18, wherein the difference between the first angle and the second angle is at least about 5°.

20. The magnetic recording system of claim 16, and further comprising:
a reader assembly, wherein at least a portion of the reader assembly is disposed at a non-zero angle relative to the trailing edge of the write element.

21. The magnetic recording system of claim 16, and further comprising:
a second shield adjacent to a trailing edge of the write element, wherein the first shield is integral with the second shield.

* * * * *